J. GILLOOLY.
HORSESHOE.
APPLICATION FILED JAN. 15, 1915.
1,142,320.
Patented June 8, 1915.
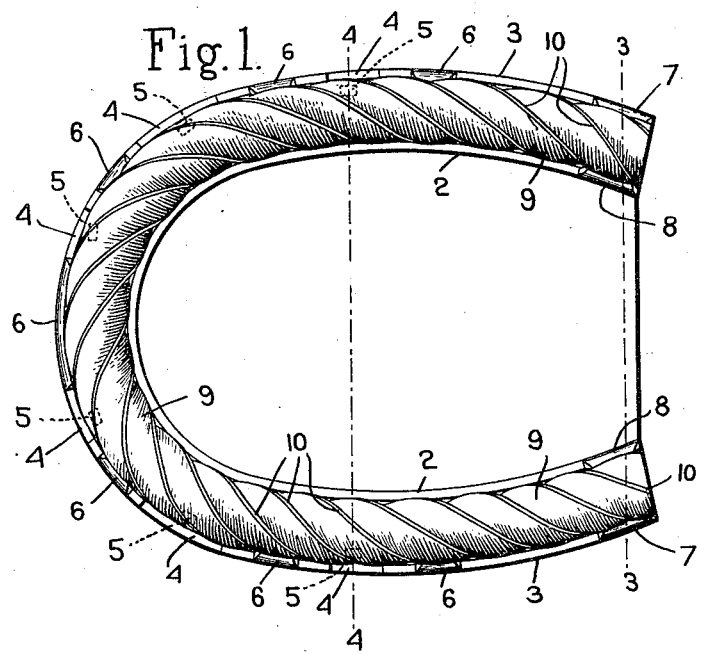
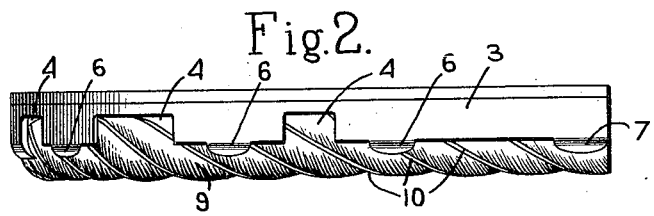
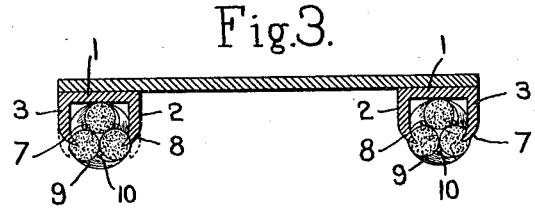
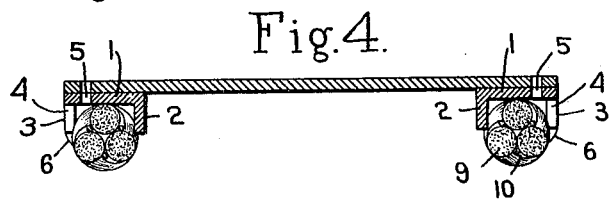
Witnesses.
J. Morrill Fuller
William E. Gagen
Inventor.
John Gillooly,
by Heard Smith & Tennant.
Atty's.

UNITED STATES PATENT OFFICE.

JOHN GILLOOLY, OF NORWOOD, MASSACHUSETTS.

HORSESHOE.

1,142,320.  Specification of Letters Patent.  Patented June 8, 1915.

Application filed January 15, 1915. Serial No. 2,465.

*To all whom it may concern:*

Be it known that I, JOHN GILLOOLY, a citizen of the United States, and resident of Norwood, county of Norfolk, State of Massachusetts, have invented an Improvement in Horseshoes, of which the following description, in connection with the accompanying drawing, is a specification, like characters on the drawing representing like parts.

This invention relates to improvements in horse shoes and the principal object thereof is to provide a cushioned horse shoe which will absorb in a measure the shocks to the legs of a horse in traveling upon a hard road and which will also be adapted to prevent the horse from slipping.

At the present time the "good roads" movement throughout many States has resulted in the building of hardened surfaced roads which are excessively rounded toward the center, making it necessary for the horse to travel on a somewhat inclined surface if road regulations are obeyed and the vehicle kept to one side of the center of the road. These hardened roads which are largely of tar or oily composition through the country and of asphalt, wooden block, and the like in the city districts, are very slippery, especially when slightly moistened so that a horse wearing the ordinary steel horse shoes is likely at any time to slip and strain or otherwise severely injure himself. Furthermore, these roads are exceedingly hard and the shocks to the legs of the horse traveling at speed over them frequently stiffens the horse, rendering him unfit for driving purposes.

The principal object of the present invention is to provide an anti-slipping cushioned shoe which will be effective in use and which may be easily repaired and maintained in an anti-slipping condition by the horseman, even without the aid of a blacksmith.

Another object of the invention is to provide a horse shoe of relatively thin but strong construction which may be used with a pad for a horse's foot to prevent the wedging in of gravel, stones, etc., between the shoe and the frog of the foot.

Another object of the invention is to provide a horse shoe having a resilient preferably fibrous cushioned tread with means for securing the cushion from displacement so that it may be securely fastened within the metallic portion of the shoe.

Other objects of the invention will more fully appear from the following description, the accompanying drawings, and will be particularly pointed out in the annexed claim.

In the drawings: Figure 1 is an underside view of a horse shoe embodying my invention resting upon a protecting pad for the horse's foot, Fig. 2 is a side elevation, Fig. 3 is a transverse sectional view on lines 3—3 Fig. 1, and, Fig. 4 is a transverse sectional view on lines 4—4, Fig. 1.

The preferred embodiment of the invention comprises a horse shoe constructed of channel iron or steel, preferably the latter. The channel iron comprises a flat base portion 1 with substantially vertical walls 2 and 3, the inner wall 2 being continuous and the outer wall provided with spaced recesses 4 opposite the nail holes 5, through which the nails are driven to secure the shoe in place upon the horse's foot.

As illustrated herein the horse shoe is symmetrical in form, having three nail holes upon each side, but it is to be understood that any number of nail holes and corresponding recesses may be provided, such for example as two upon one side and three upon the other, or three upon one side and four upon the other, as in shoes frequently used in trotting and road horses.

The outer sectional wall of the channel may be and desirably is drawn out at intervals to provide clips 6, adapted to be bent inwardly to retain the cushion within the channel of the shoe. These clips are preferably drawn out from the central portion of each section of the outer wall, leaving the wall substantially its full strength adjacent to the recess. Larger clips 7, and 8 are provided upon the outer and inner walls respectively at the heel end of the shoe and are adapted to be clenched firmly upon the end of the cushioning material so as to prevent its creeping around in the channel or other displacement. The cushioning material is preferably in the form of a rope 9 impregnated with a bituminous material, tar, rosin, or other non-slipping water-proof material. The rope is desirably made in three strands, 9 twisted in the usual manner and is provided with spirally disposed strengthening members desirably in the form of wires 10 twisted in with each of the respective strands of rope and normally lying beneath the plane of the surface of the rope. The rope used is of course of a proper size to fit the channel of the horse shoe and is secured therein by turning over the clips 6 until they engage firmly the outer sides of the rope and press the opposite portion thereof firmly against the inner channel.
The end clips 7 and 8 are bent inwardly and firmly embedded in the rope at the heel end of the horse shoe so as to firmly lock the ends of the rope in place and to prevent any possible slipping or creeping thereof.
The wires which are interlaced with the strands of the rope longitudinally while preserving the soft tread of the shoe, serve not only to stiffen the rope but also to prevent the same from being broken up or knocked out of position in the channel by a glancing blow upon a stone or other obstruction since the wire of the rope will underlie the inturned in portion of the clips sufficiently to prevent the rope from being torn out.
It will be obvious that different sized ropes may be used to conform to the usage to which the shoe is to be placed, that is to say, a rope of three quarters of an inch in diameter may be used for a light road horse, where a rope of one and an eighth to one and a quarter inches in diameter may be used for a heavy draft horse such as a fire horse. In such case the metallic channel bar which forms the horse shoe will be made correspondingly large and whereas with a three quarters of an inch shoe the height of the flange will be substantially one half inch, with the larger shoe it will be three quarters of an inch or even more, to conform to the size of the rope. The horse shoe thus constructed may be made of relatively light channel bar, the base portion 1 being sufficiently thin to permit the use of a leather pad beneath the same for the purpose of protecting the horse's foot.
The recessed portions 4 of the outer channel bar provide an easy means for driving the nails into the hoof so that the shoe may be secured properly upon the horse's hoof without danger of pricking the foot.
When shoeing the horse the shoe is first shaped in the usual manner to fit the hoof and is then nailed upon the hoof with or without the protecting pad as may be desired. The rope cushion is then laid in the shoe and the end clips 7—8 bent firmly down upon and embedded in the rope. The side clips 6 may then be bent inwardly until they are partially embedded in the rope and press the same firmly against the inner wall of the channel. The clips when thus bent overlie or engage the wires which are embedded in the rope in such a manner that it is quite impossible to displace the rope from its proper position, even when the shoe strikes a sharp obstruction. The wires also prevent the cutting of the rope by sharp objects and being embedded in the rope do not present a metallic surface which will slip upon the pavement.
While hemp rope of the ordinary character can be used in such horse shoes I find it preferable that rope treated with tar, rosin or like compositions be used since particles of sand, gravel, etc., adhere to such rope presenting a greater or less wearing surface which increases the life of the rope.
When the rope is worn down until the ends of the clips begin to project the rope can be easily removed by the horseman by merely inserting a chisel beneath the clips and bending them upwardly, whereupon a new rope can be introduced and the clips again clenched by the hammer in the manner aforesaid, thus providing an easy means by which the horseman may maintain the shoes of his own horse in proper condition and saving time and expense in having the horse reshod. This feature is of great importance since as is well known the cost of the cushioned horse shoes upon the market is excessive and the rapid wearing of the shoes requires very frequent replacement.
By this invention a relatively cheap horse shoe is provided which will not cost more than the usual steel shoe and when once placed upon the horse's foot the cushion may be repeatedly renewed without additional cost.
Having thus described my invention, what I claim as new and desire to secure by Letters Patent, is:
A cushioned horse shoe comprising a channel bar having a base provided with nail holes, a continuous inner wall and a substantially parallel outer wall, the heel ends of both the outer and inner walls being drawn out to form oppositely disposed cushion retaining clips, the outer wall being also provided with like clips disposed at intervals, a cushion in said channel consisting of a rope having a plurality of strands, and binding wires embedded between and parallel to the adjacent strands whereby the cushioning member is strengthened and securely retained in said channel and the soft tread of the shoe preserved.
In testimony whereof, I have signed my name to this specification, in the presence of two subscribing witnesses.

JOHN GILLOOLY.

Witnesses:
 FREDERICK A. TENNANT,
 THOMAS J. DRUMMOND.